UNITED STATES PATENT OFFICE.

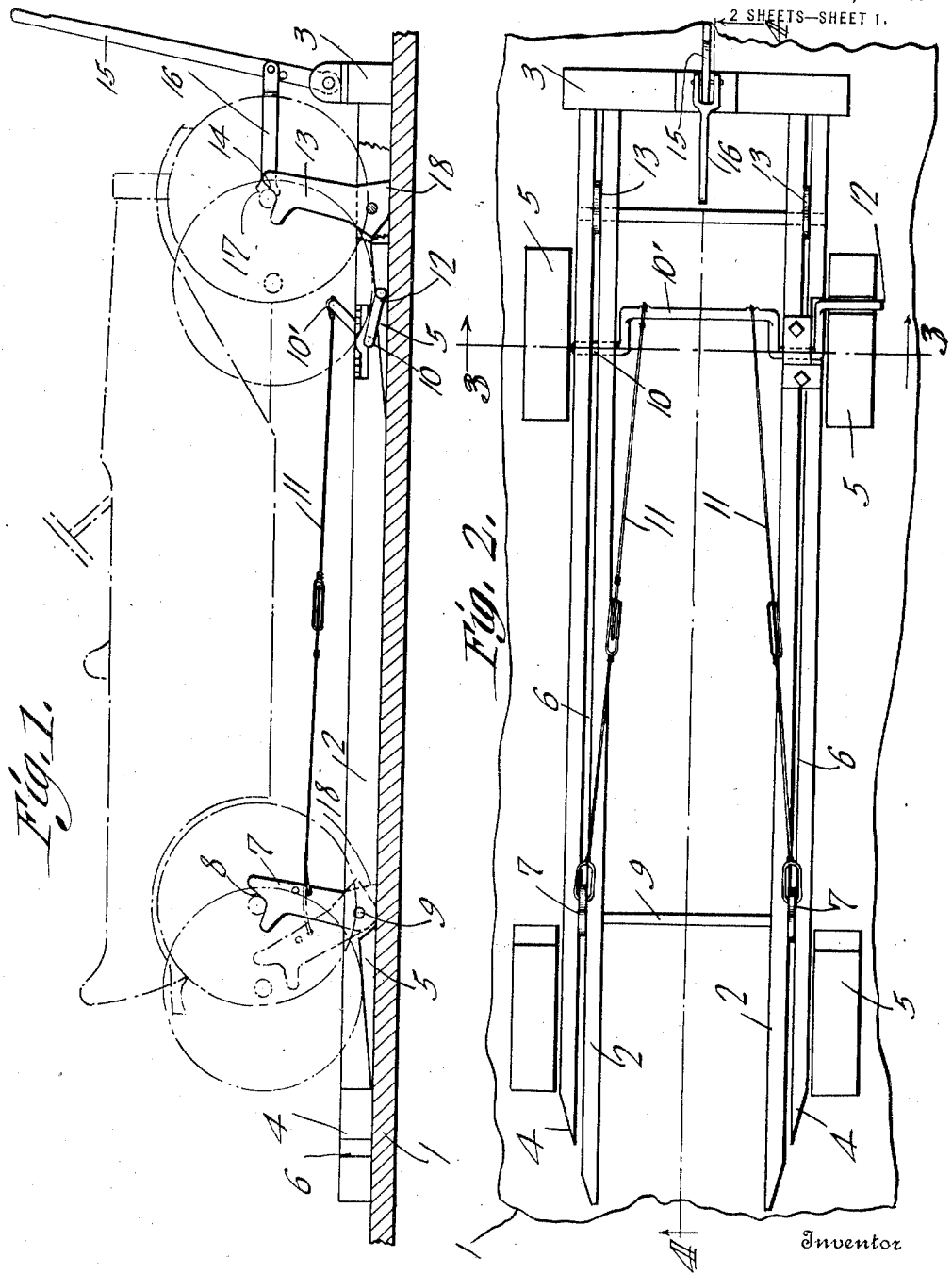

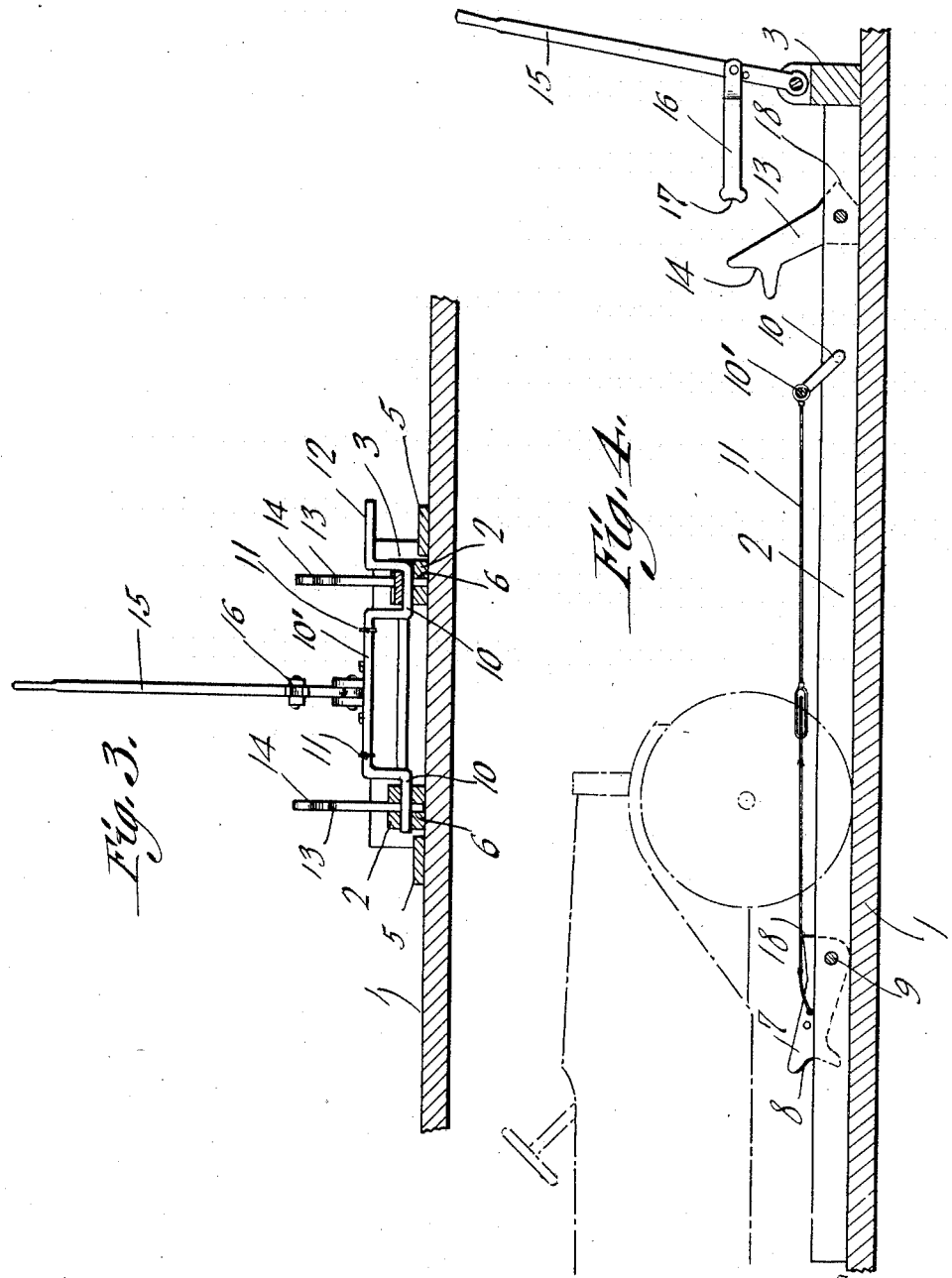

HENRY D. BALL, OF CLARKESVILLE, TENNESSEE, ASSIGNOR OF ONE-HALF TO EDWARD L. BRADBURY, OF CLARKESVILLE, TENNESSEE.

AUTOMOBILE-HOIST.

1,334,431.  Specification of Letters Patent.  Patented Mar. 23, 1920.

Application filed March 3, 1919. Serial No. 280,196.

*To all whom it may concern:*

Be it known that I, HENRY D. BALL, a citizen of the United States, residing at Clarkesville, in the county of Montgomery and State of Tennessee, have invented a new and useful Automobile-Hoist, of which the following is a specification.

This invention relates to hoists or jacks for automobiles and is more especially designed for supporting the wheels of the vehicle off of the ground or floor while in storage. One of the objects of the invention is to provide means whereby the forward movement of the automobile will cause the front and rear axles to be engaged by lifting members which will be shifted by the momentum of the forwardly moving vehicle so as to move the vehicle off of its supporting surface and suspend it out of contact with the ground.

A further object is to provide means actuated by the forwardly moving front wheels of the vehicle for shifting the lifting means of the rear axle into operative position.

With the foregoing and other objects in view which will appear as the description proceeds, the invention consists of certain novel details of construction and combinations of parts which will be hereinafter more fully described and pointed out in the claim, it being understood that various changes may be made in the construction and arrangement of the parts without departing from the spirit or sacrificing any of the advantages of the invention as set forth in the appended claim.

In the accompanying drawings the preferred form of the invention has been shown.

In said drawings—

Figure 1 is a view partly in side elevation and partly in longitudinal section showing an automobile held in elevated position by the device.

Fig. 2 is a plan view of the device showing the parts in normal position.

Fig. 3 is a section on line 3—3, Fig. 2.

Fig. 4 is a longitudinal section on line 4—4, Fig. 2.

Referring to the figures by characters of reference, 1 designates the base or floor on which are secured parallel guide rails 2 which are connected at one end by a cross beam or bumper 3 which extends laterally therebeyond, while the other ends of the rails have their outer sides converging, as at 4, to constitute deflectors. The distance between the outer faces of the rails is slightly less than the distance between the wheels at one side of an automobile and the wheels at the opposite side. Secured to the base 1 close to the outer sides of the rails are short inclines 5, the distance between the corresponding ends of the two inclines at each side being substantially equal to the wheel base of the automobile to be stored.

Each of the rails 2 is preferably formed of two spaced members forming a slot therebetween, as shown at 6 and extending across these slots and between the rails adjacent the high ends of the inclines 5 remote from the bumper 3 is a shaft 9. Lifting dogs 7 are mounted on this shaft and within the slots 6 and are provided at their free ends with axle seats 8. Another shaft 10 is mounted for rotation in the rails above the other inclines 5 and has an intermediate crank 10' connected by rods 11 to the dogs 7. The crank 10' is normally in a horizontal position, as shown in Fig. 2, thus holding the dogs 7 in lowered positions, as shown. A crank arm 12 is provided at one end of the shaft 10 and normally extends upwardly and overhangs one of the inclines 5. Lifting dogs 13 are pivotally mounted in the slots 6 near the bumper 3 and are provided at their upper ends with axle seats 14, these dogs being normally inclined so that the seats 14 are positioned to contact with and engage the front axle of an automobile when driven onto the device. A lever 15 is mounted on the bumper 3 and has a push bar 16 pivotally connected thereto and provided with a recessed axle engaging end 17.

Under normal conditions the dogs 7 are in lowered positions, the crank arm 12 is raised and the dogs 13 are inclined upwardly away from the bumper as shown in Fig. 4. An automobile to be stored is driven along the device so that its running gear will straddle the rails with the wheels close to the outer sides thereof. The wheels will travel onto the inclines 5, the front axle passing over the dogs 7 and coming against the upper ends of the dogs 13. The vehicle will press against the dogs and shift them toward the bumper, one of the front wheels coming against the crank arm 12 and pressing it down. This will cause the crank 10' to pull through the rods 11 on the dogs 7 which will be quickly swung upwardly to bring the seats 8 under and in engagement with the rear axle. Just as the wheels pass off of the high ends of the inclines 5 the dogs 7 and 13 are thrust past their dead centers and swing forward until shoulders 18 thereon come against the base 1 and stop further movement. Thus the automobile will be held in elevated position by the axles resting on the dogs and with the wheels out of contact with the ground. By placing the end of the bar 16 in engagement with the front axle and pushing through the lever 15, the automobile can be pressed back off of the dogs and onto the inclines 5, thus resetting the parts for further use.

What is claimed is:—

The combination with parallel guide rails arranged in pairs, and inclines arranged in pairs, said rails extending between the inclines, of rear axle engaging dogs pivoted between the rails of each pair and adjacent one pair of inclines, front axle engaging dogs pivotally mounted between the rails of each pair adjacent the other inclines, a crank shaft journaled in the rails, adjustable connections between the crank of said shaft and the rear axle dogs, a wheel actuated crank arm upon the crank shaft, there being a recess in one of the inclines for receiving said arm, a base under the rails, and shoulders on the dogs and coöperating with the base to hold the dogs against movement when thrust in one direction past their dead centers.

In testimony that I claim the foregoing as my own, I have hereto affixed my signature in the presence of two witnesses.

HENRY D. BALL.

Witnesses:
BIRNEY AUSTIN,
C. W. BAILEY.